(12) United States Patent
Kang et al.

(10) Patent No.: US 9,743,065 B2
(45) Date of Patent: Aug. 22, 2017

(54) METHOD AND APPARATUS GENERATING COLOR AND DEPTH IMAGES

(71) Applicant: Samsung Electronics Co., Ltd., Suwon-si, Gyeonggi-do (KR)

(72) Inventors: Byongmin Kang, Yongin-si (KR); Jungwoo Kim, Hwaseong-si (KR); Hongseok Lee, Seongnam-si (KR); Dokyoon Kim, Seongnam-si (KR); Keechang Lee, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 226 days.

(21) Appl. No.: 14/502,026

(22) Filed: Sep. 30, 2014

(65) Prior Publication Data
US 2015/0092018 A1    Apr. 2, 2015

(30) Foreign Application Priority Data

Sep. 30, 2013   (KR) .................. 10-2013-0116897

(51) Int. Cl.
| | | |
|---|---|---|
| *H04N 7/18* | (2006.01) | |
| *H04N 13/00* | (2006.01) | |
| *H04N 13/02* | (2006.01) | |
| *G01S 17/42* | (2006.01) | |
| *G01S 17/89* | (2006.01) | |
| *G01S 7/486* | (2006.01) | |

(52) U.S. Cl.
CPC .......... *H04N 13/004* (2013.01); *G01S 7/486* (2013.01); *G01S 17/42* (2013.01); *G01S 17/89* (2013.01); *H04N 13/0025* (2013.01); *H04N 13/0037* (2013.01); *H04N 13/0207* (2013.01)

(58) Field of Classification Search
CPC .......... H04N 13/0239; H04N 13/0055; H04N 13/0296
USPC ...................... 348/42–60, 164–168
See application file for complete search history.

(56) References Cited

U.S. PATENT DOCUMENTS

| | | |
|---|---|---|
| 7,271,839 B2 | 9/2007 | Lee et al. |
| 7,915,652 B2 | 3/2011 | Lee et al. |
| 8,259,203 B2 | 9/2012 | Baldwin |
| 8,345,103 B2 | 1/2013 | Kim |
| 2011/0079714 A1 | 4/2011 | McEldowney et al. |
| 2012/0140099 A1 | 6/2012 | Kim et al. |
| 2013/0033578 A1* | 2/2013 | Wajs ............... G06T 7/0065 348/46 |
| 2013/0188057 A1 | 7/2013 | Lin |

(Continued)

FOREIGN PATENT DOCUMENTS

| | | |
|---|---|---|
| KR | 10-0447403 | 9/2004 |
| KR | 10-2010-0059361 | 6/2010 |

(Continued)

OTHER PUBLICATIONS

Extended European Search Report dated Feb. 17, 2015 issued in corresponding European Application No. 14187123.6.

*Primary Examiner* — Andy Rao
(74) *Attorney, Agent, or Firm* — Harness, Dickey & Pierce, P.L.C.

(57) ABSTRACT

Provided are methods and apparatuses generating a color image and a depth image by using a first filter that transmits light in multiple wavelength bands and a second filter that transmits light in a particular wavelength band that is included in multiple wavelength bands.

33 Claims, 12 Drawing Sheets

(56) References Cited

U.S. PATENT DOCUMENTS

2014/0078459 A1  3/2014  Kim et al.
2014/0291520 A1  10/2014 McEldowney et al.

FOREIGN PATENT DOCUMENTS

KR  10-2010-0103504  9/2010
KR  10-2012-0046042  5/2012

* cited by examiner

METHOD AND APPARATUS GENERATING COLOR AND DEPTH IMAGES

CROSS-REFERENCE TO RELATED APPLICATIONS

This application claims the benefit of Korean Patent Application No. 10-2013-0116897, filed on Sep. 30, 2013, in the Korean Intellectual Property Office, the disclosure of which is incorporated herein in its entirety by reference.

BACKGROUND

1. Field

One or more embodiments of the present disclosure relate to methods and apparatuses generating color and depth images.

2. Description of the Related Art

As a method of obtaining a depth image of a subject, a time of flight (ToF) method may be used where the depth image is based on the time from which an infrared ray (IR) is emitted toward a subject and the reflection of the emitted IR returns. A depth image, obtained by using the ToF method, may be obtained by determining a phase difference between an emitted IR signal, obtained by emitting an IR toward a subject, and a reflection of the emitted IR signal, reflected from the subject and returns, for example. A ToF depth camera employing such a method may obtain a depth of a subject in real time with respect to all pixels, for example, compared to other conventional cameras (for example, a stereo camera, or the like) for obtaining a depth image of a subject. Another method of obtaining a depth image includes using a structured light camera, which acquires depth information of a subject by emitting a particular IR pattern toward the subject and then performing triangulation, for example, comparing the reflected pattern features with a reference image.

Generally, in order to generate a three-dimensional (3D) image of a subject, a color image of the subject, as well as a depth image of the subject, may be necessary. A color image and a depth image may be obtained by mounting a color camera near a depth camera, e.g., a ToF depth camera. If both the ToF depth camera and the color camera are used, the size of the image generation system becomes large. Additionally, since viewpoints of the ToF depth camera and the color camera differ, i.e., because they respectively observe the subject from different positions, a process of additionally matching the generated color and depth images may typically be required.

Recently, research has been conducted into a method of generating a color image and a depth image by using the same sensor, which may alleviate the matching requirement of other conventional systems. Here, generally, a first incident light passes through a visible pass filter for generating a color image and a second incident light passes a separate infrared pass filter for generating a depth image. Accordingly, in order to generate a color image and a depth image by using the same sensor, light must proceed first through the visible pass filter and the separate infrared pass filter.

SUMMARY

One or more embodiments may include methods and apparatuses generating a color image and a depth image by using a first filter that transmits light in multiple wavelength bands and a second filter that transmits light in a select wavelength band from the multiple wavelength bands.

Additional aspects will be set forth in part in the description which follows and, in part, will be apparent from the description, or may be learned by practice of the presented embodiments.

One or more embodiment may include an image generation apparatus generating an image by using light reflected from a subject, the image generation apparatus including a first filter to transmit light of multiple wavelength bands from the light reflected from the subject, a second filter to selectively transmit light in a select wavelength band from the light of the multiple wavelength bands, according to a control signal, a detection unit to detect a first image by photo-electrically converting the light of the multiple wavelength bands and detect a second image by photo-electrically converting the light in the select wavelength band, and an image processing unit to generate a color image and a depth image by using a difference image, obtained by subtracting the second image from the first image, and the second image.

One or more embodiments may include a method of generating an image by using light reflected from a subject, the method including performing first filtering to transmit light in multiple wavelength bands that include the light reflected from the subject, detecting a first image by photo-electrically converting the light in the multiple wavelength bands passed by the first filtering, performing second filtering to transmit light in a select wavelength band from the light in the multiple wavelength bands, detecting a second image by photo-electrically converting the light in the select wavelength band passed by the second filtering, and generating a color image and a depth image based on a difference image, obtained by subtracting the second image from the first image, and the second image.

One or more embodiments may further include a non-transitory computer-readable recording medium comprising computer readable code to control at least one processing device to implement a method of generating an image using light reflected from a subject.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
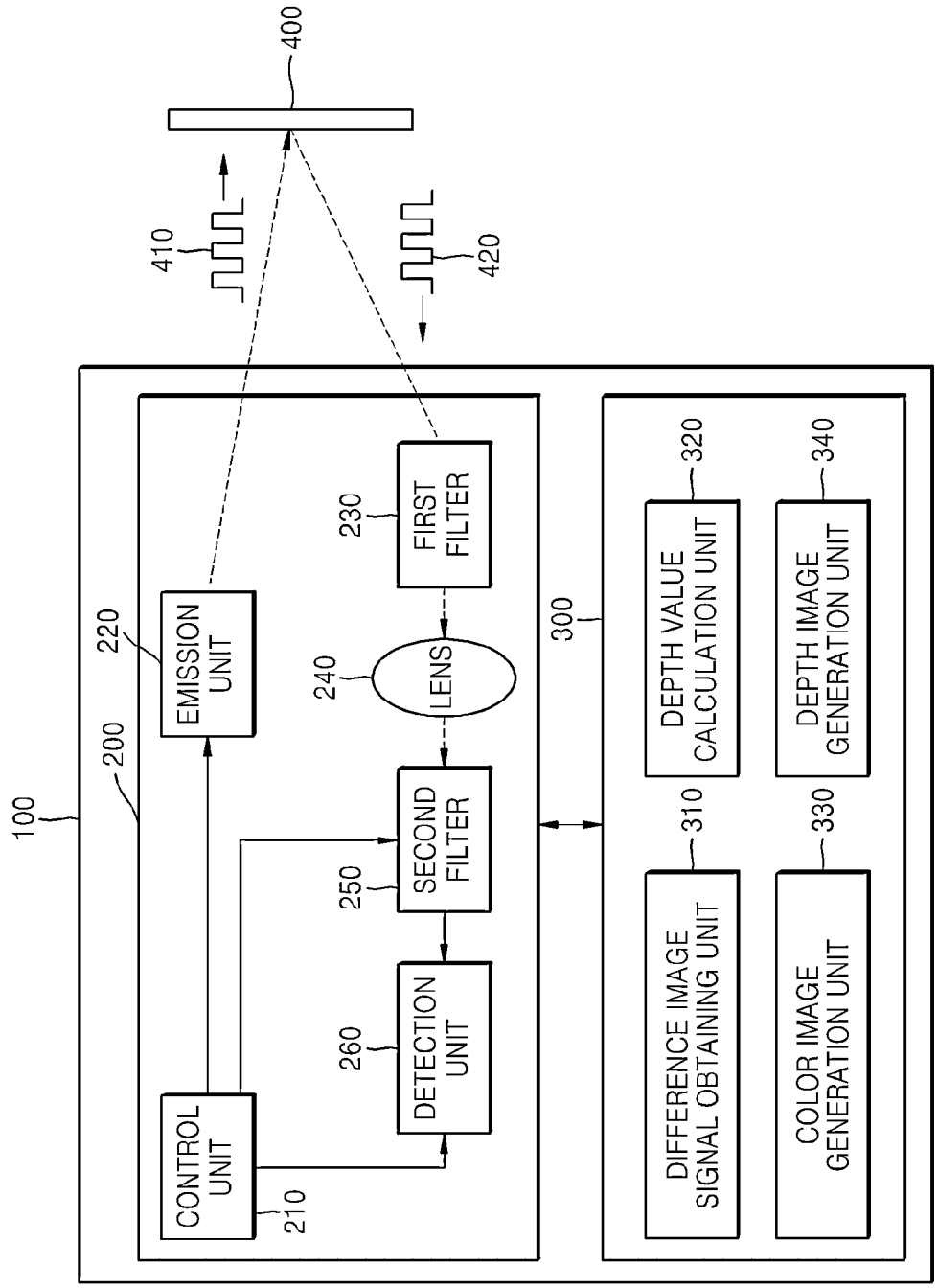
FIG. 1 illustrates an image generating apparatus, according to one or more embodiments.

Reference will now be made in detail to embodiments, examples of which are illustrated in the accompanying drawings, wherein like reference numerals refer to like elements throughout. In this regard, embodiments may have different forms and should not be construed as being limited to the descriptions set forth herein. Accordingly, one or more embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not solely modify the individual elements of the list.

One or more embodiments of the present disclosure relate to a method and an apparatus generating color and depth images.

FIG. 1 illustrates an image generating apparatus 100, according to one or more embodiments.

Referring to FIG. 1, the image generating apparatus 100 may include an imaging apparatus/unit 200 and an image processing apparatus/unit 300, for example. The imaging apparatus 200 may include a control unit 210, an emission unit 220, a first filter 230, a lens 240, a second filter 250, and a detection unit 260, for example. The image processing apparatus 300 may include a difference image obtaining unit 310, a depth value calculation unit 320, a color image generation unit 330, and a depth image generation unit 340, for example. It may be understood by one of ordinary skill in the art that, in addition to the elements shown in FIG. 1, other elements may be further included, according to one or more embodiments. Hereinafter, referring to FIG. 1, the example elements of the image generation apparatus 100, the imaging apparatus 200, and the image processing apparatus 300 will be described in greater detail.

The image generating apparatus 100 may include the imaging apparatus 200 configured to capture an image with respect to a subject 400 and the image processing apparatus 300 configured to perform image processing on a captured image. The image generating apparatus 100 may receive light reflected from the subject 400 and generate a color image or a depth image with respect to the subject 400 by using the reflected light. The light reflected from the subject 400 may be light that is obtained when natural light such as sunlight is reflected from the subject 400, and the light reflected from the subject 400 may be light that is obtained when light, modulated to have a predetermined frequency or light in a particular pattern, is emitted toward and reflected from the subject 400. As only examples, a depth image of the subject 400 may be generated using a time of flight (ToF) method, such as described above, or may be generated using a structured light camera method, as discussed above.

As shown in FIG. 1, the imaging apparatus 200 may include the emission unit 220, the first filter 230, the lens 240, the second filter 250, the detection unit 260, and the control unit 210, e.g., controlling the same, for example.

If the image generating apparatus 100 generates an image with respect to the subject 400, the emission unit 220 may emit light in a predetermined wavelength band toward the subject 400. In detail, the emission unit 220 may emit emission light 410, modulated into a predetermined frequency, e.g., an IR frequency, toward the subject 400 based on a control signal from the control unit 210. The emission unit 220 may be formed of a light-emitting diode (LED) array or a laser apparatus, as only examples.

A depth image that represents a distance between the subject 400 and the imaging apparatus 200, for example, may be obtained by using IR light, particularly, near infrared (NIR) light. Accordingly, if the image generating apparatus 100 generates a depth image, the emission unit 220 may emit the emission light 410, which is modulated into a predetermined frequency in correspondence with IR light, toward the subject 400.

The first filter 230 may transmit incident light in multiple wavelength bands from among light that is reflected from the subject 400, for example, and incident on the imaging apparatus 200. That is, the first filter 230 may transmit the light in the multiple wavelength bands that are included in the light reflected from the subject 400. The light in the multiple wavelength bands may include IR light, e.g., that is a reflection of IR light emitted by the emission unit 220 toward the subject 400, and visible light reflected from the subject 400, for example.

The first filter 230 may be formed of a multiple band-pass filter that may transmit light in at least two wavelength bands from the incident light. Light in the at least two wavelength bands, transmitted through the first filter 230, may respectively be visible light and IR light, for example. The first filter 230 may be a fixed filter through which wavelength bands of light which may be transmitted is preset. As only an example, the first filter may not be a variable filter. The first filter 230 may be disposed between the lens 240 and the subject 400 or between the lens 240 and the second filter 250, for example. The first filter 230 may also be in a form in which the first filter 230 is a coating on the lens 240. Thus, light reflected from the subject 400 may sequentially pass through the first filter 230 and the second filter 250.

The image generating apparatus 100 may generate a color image by using visible light and a depth image by using IR light. Light that is incident on the imaging apparatus 200 may be various types of light reflected from the subject 400 and may include light in other wavelength bands, as well as visible light or IR light. Accordingly, the first filter 230 may respectively transmit wavelength bands for visible light and IR light, for generating a color image or a depth image, from among various types of light reflected from the subject 400. The first filter 230 may obstruct light in other wavelength bands. Briefly, in one or more embodiments, the detection unit 260 may include a light capturing element, such as a complementary metallic oxide semiconductor (CMOS) image sensor or a charge-coupled device (CCD) image sensor, or other light detecting sensors, as well as separate visible light wavelength band filters, such as red, blue, and green filters, e.g., which may be arranged in a Bayer format, as only an example. Such separate visible light wavelength band filters of the detection unit 260 may be distinguished from the first filter 230 and the second filter 250.

Figure 2:
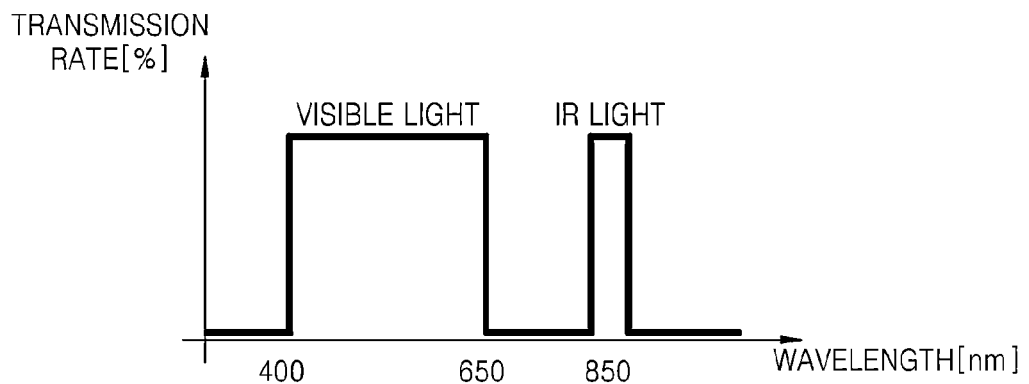
FIG. 2 illustrates a graph explaining light transmission characteristics of a first filter, which may pass visible light and IR light, according to one or more embodiments.

FIG. 2 illustrates a graph explaining example light transmission characteristics of a first filter, such as the first filter 230 of FIG. 1. Referring to FIG. 2, the first filter 230 may transmit light in select wavelength bands. In one or more embodiments, these select wavelength bands include a visible light wavelength band that ranges from 400 nm to 650 nm and an IR light wavelength band of about 850 nm, for example. However, the select wavelength bands are not limited thereto. Depending on embodiment, wavelength bands of light that may be transmitted by the first filter 230 may be different depending on the characteristics of the first filter 230.

The lens 240 may collect light that is incident on the imaging apparatus 200. In detail, the lens 240 may collect various types of light reflected from the subject 400, including reflection light 420 that is obtained when emission light 410 is reflected from the subject 400 and natural light reflected on the subject 400.

The second filter 250 may selectively transmit light in a particular/select wavelength bands, e.g., as included in light in multiple wavelength bands that are passed through the first filter 230, according to a control signal. The second filter 250 may be a variable filter through which the wavelength band(s) of light that may be transmitted by the second filter 250 is changed according to a control signal. For example, the second filter 250 may be controlled so that if a voltage of a control signal is equal to or less than a threshold voltage, the second filter 250 may transmit light in all wavelength bands, e.g., including the visible wavelength band and the IR wavelength band. However, if a voltage of a control signal is greater than a predetermined threshold value, for example, the second filter 250 may transmit light in a particular/select wavelength band of the light passed through the first filter 230, e.g., the visible wavelength band or the IR wavelength band. In other words, according to an operation of the second filter 250, light in the multiple wavelength bands that have passed through the first filter 230 may also be controlled to pass through the second filter 250. Alternately, light in a particular/select wavelength band, from among the light in the multiple wavelength bands that have passed through the first filter 230, may be controlled to pass through the second filter 250. For example, in one or more embodiments, wavelength bands of light that ultimately pass through the first filter 230 and the second filter 250 may be selectively controlled according to a control signal output to the second filter 250 by the control unit 210.

Figure 3A:
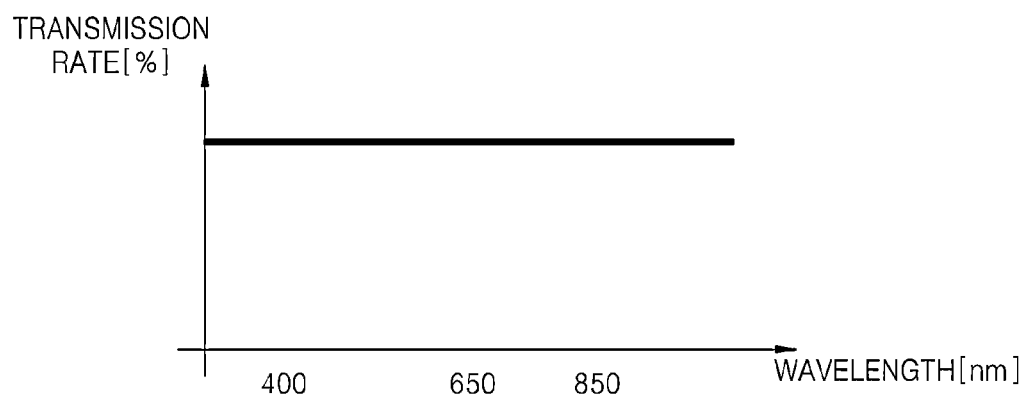
FIGS. 3A and 3B illustrate graphs for explaining light transmission characteristics of a second filter, according to one or more embodiments.
Figure 3B:
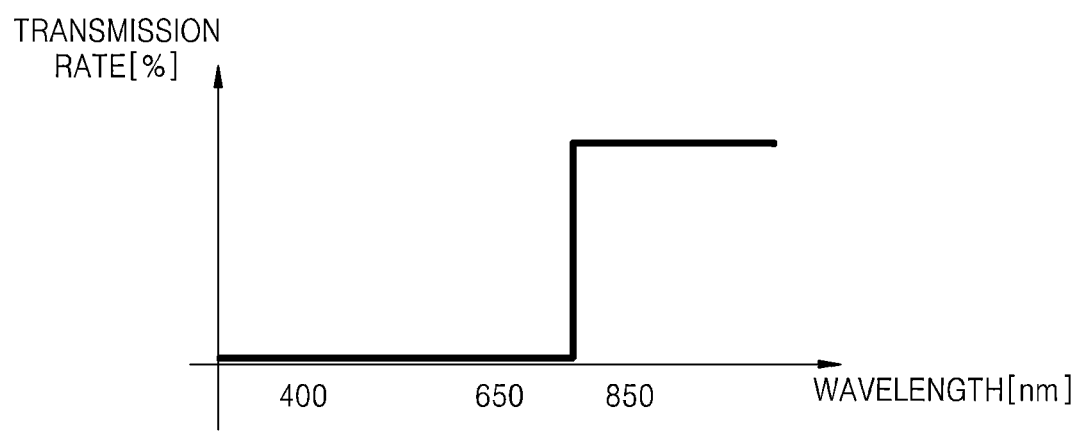

FIGS. 3A and 3B illustrate graphs explaining example light transmission characteristics of a second filter, such as the second filter 250 of FIG. 1. In detail, FIG. 3A illustrates a graph explaining which wavelength bands of incident light are transmitted through the second filter 250 according to a first control signal, e.g., FIG. 3A illustrates that all wavelength bands of incident light may be passed through toward the detection unit 260. FIG. 3B illustrates a graph explaining which wavelength bands of incident light are transmitted through the second filter 250 according to a second control signal, e.g., FIG. 3B illustrates that wavelength bands corresponding to visible light may be prevented from passing through the second filter 250, resulting in only light in a IR wavelength band passing through toward the detection unit 260. A voltage of the first control signal may be a voltage that is less than a voltage of the second control signal, as only examples, noting that alternative selective wavelength band filtering controlling approaches are also available.

Figure 4:
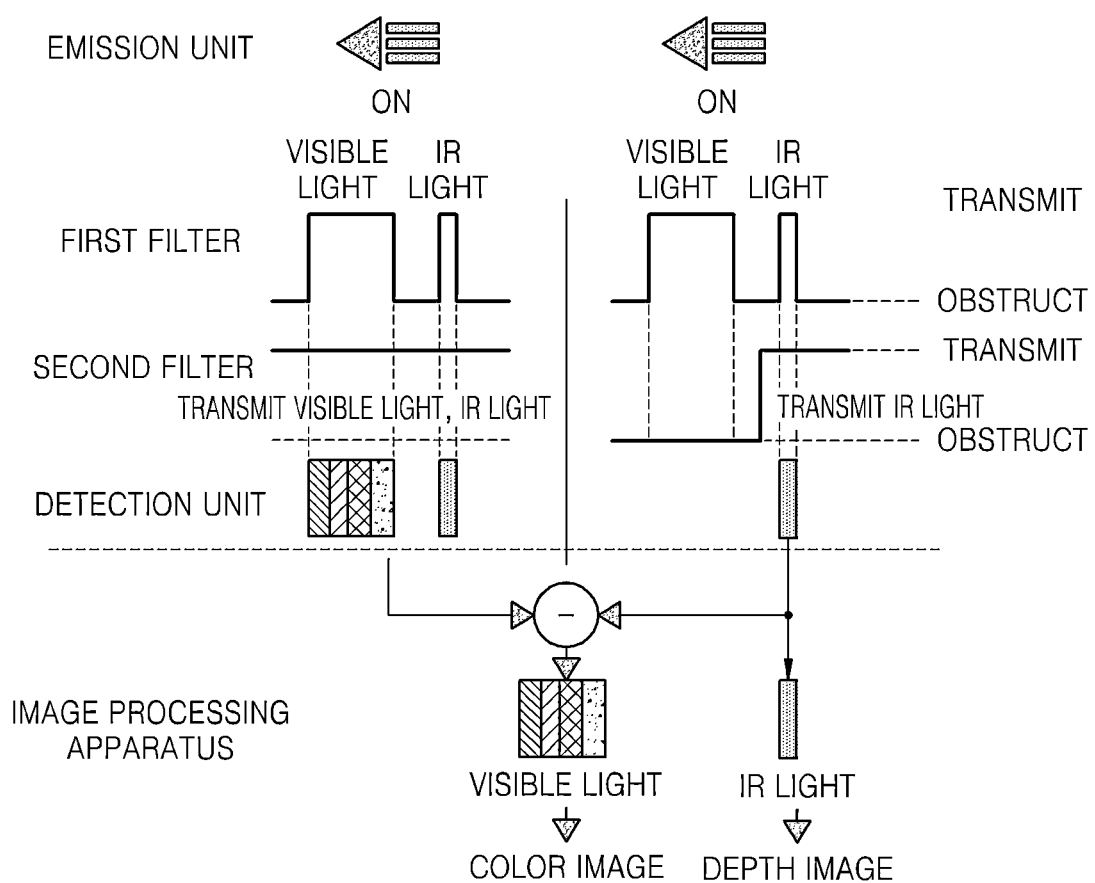
FIG. 4 illustrates a diagram explaining a process of generating a color image and a depth image, according to one or more embodiments.
Figure 9:
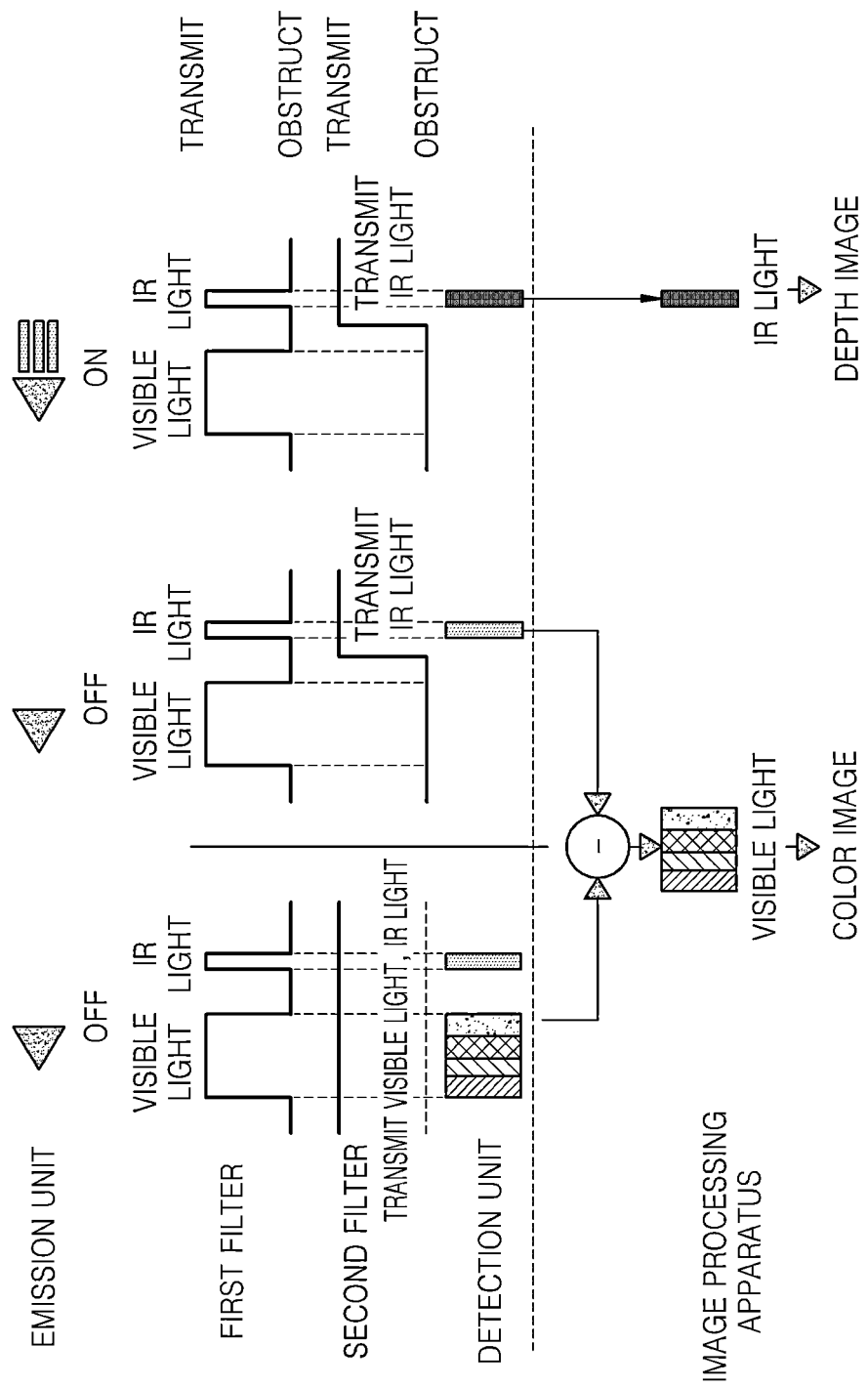
FIG. 9 illustrates a diagram explaining a process of generating a color image and a depth image, according to one or more embodiments.

Accordingly, in one or more embodiments, since light incident on the second filter 250 may be light in multiple wavelength bands that have passed through the first filter 230, light that passes through the second filter 250 may be controlled to be light in the multiple wavelength bands (in the case of the example first control signal) or light in a particular/select wavelength band of the multiple wavelength bands (in the case of the second control signal). Thus, FIG. 3B shows that IR light is transmitted and visible light is obstructed by the second filter 250 according to the second control signal. Unlike the operation of the first filter 230 shown in FIG. 2, the second filter 250 may transmit visible light and IR light according to a first control signal and further obstruct visible light according to a second control signal, such as illustrated in FIGS. 4 and 9. Alternatively, the second filter 250 may be controlled to transmit visible light and IR light according to the first control signal and obstruct IR light according to a second control signal. Depending on embodiment, the select wavelength band(s) of light to be transmitted by the second filter 250 may be different depending on the characteristics of the second filter 250.

As noted above, the detection unit 260 may detect an image by photo-electrically converting an incident light, e.g., reflection light 420, after passing through the first filter 230 and second filter 250. The detection unit 260 may detect an image by photo-electrically converting incident light having a particular/select frequency band or incident light having different frequency bands, and depending on embodiment the detection unit 260 may convert incident light of different wavelength bands differently, e.g., with a red filter for at least red wavelengths, a blue filter for at least blue wavelengths, a green filter for at least green wavelengths, as only an example. The detection unit 260 may detect values, which correspond to amounts of charges that are photo-electrically converted, for an image. For example, color values of a sensor array which corresponds to amounts of charges that are photo-electrically converted may be detected as an image. According to an embodiment, since light that passes through the first filter 230 and the second filter 250 and is incident on the detection unit 260 as light in multiple wavelength bands or light in a particular/select wavelength band, included in multiple wavelength bands, a first image and a second image may be detected by respectively photo-electrically converting the light in multiple wavelength bands and then light in a particular/select wavelength band, or by converting the light in the particular/select wavelength band and then the light in the multiple wavelength bands. Thus, depending on embodiment, the detection unit 260 may detect a first image that is obtained by photo-electrically converting light in multiple wavelength bands and a second image that is obtained by photo-electrically converting light in a particular/select wavelength band. The detection unit 260 may provide the detected images to the image processing apparatus 300.

As noted above, the detection unit 260 may include a complementary metallic oxide semiconductor (CMOS) image sensor or a charge-coupled device (CCD) image sensor which is formed of a photodiode array or a photo-gate array. A photodiode may be a pinned photo diode, but is not limited thereto.

The detection unit 260 may provide amounts of charges, which are detected when photodiode circuits operate with a predetermined phase difference, to the image processing apparatus 300. A predetermined phase difference may be 180°, for example. In detail, here, with a reference (0°) to a period in which one of the photodiode circuits operates, the detection unit 260 may detect amounts of charges by operating different photodiode circuits to have a phase difference of 180° from the reference (0°). Additionally, the detection unit 260 may detect amounts of charges by operating one of the photodiode circuits to have a difference of 90° from the reference (0°), for example, and operating one of the photodiode circuits to have a difference of 270° from the reference (0°). As such, the detection unit 260 may provide values that correspond to amounts of charges, which are detected with a predetermined phase difference, to the image processing apparatus 300, so that the values are used to calculate a value of a depth for generating a depth image.

The image processing apparatus 300, shown in FIG. 1, may include the difference image obtaining unit 310, the depth value calculation unit 320, the color image generation unit 330, and the depth image generation unit 340, for example, and may be formed of one or more processing devices, such as a processor but not limited thereto. The one or more processing devices may be embodied as an array of a plurality of logic gates, or may be embodied as a combination of a general microprocessor, as only an example, which may include a computer readable medium, such as a memory, storing computer readable code or instructions, such as a program, that are executable by the general microprocessor. Also, it may be understood by one of ordinary skill in the art that the processing device is hardware that may be embodied in alternative forms of hardware, depending on embodiment.

The difference image obtaining unit 310 may obtain a difference image by using a first image that is obtained by photo-electrically converting light in multiple wavelength bands and a second image that is obtained by photo-electrically converting light in a particular/select wavelength band. In other words, in such an embodiment and as illustrated in an embodiment of FIG. 4, if the light in the multiple wavelength bands includes visible light and IR light, and light in a particular/select wavelength band is IR light, the difference image may ultimately represent visible light, e.g., only visible light. Differently, and as illustrated in an embodiment of FIG. 8, if the light in the particular/select wavelength band is actually visible light, the difference image may ultimately represent IR light, e.g., only IR light.

If the difference image represents visible light, the difference image obtaining unit 310 may provide the difference image to the color image generation unit 330. If the difference image represents IR light, the difference image obtaining unit 310 may provide the difference image to the depth value calculation unit 320.

The depth value calculation unit 320 may obtain a distance between the subject 400 and the image generation apparatus 100, that is, a depth value. The depth value calculation unit 320 may calculate a depth value by using the captured IR light. A ToF method, as only an example, may be used as a representative method. With regard to the ToF method, the time between when IR light is emitted toward the subject 400 and when a reflection of the emitted IR light returns may be calculated by using the captured image representing IR light, i.e., the IR image. Then, an example distance difference between the subject 400 and the image generation apparatus 100, that is, a depth value, may be obtained by multiplying the calculated time by a speed of the IR light.

Figure 8:
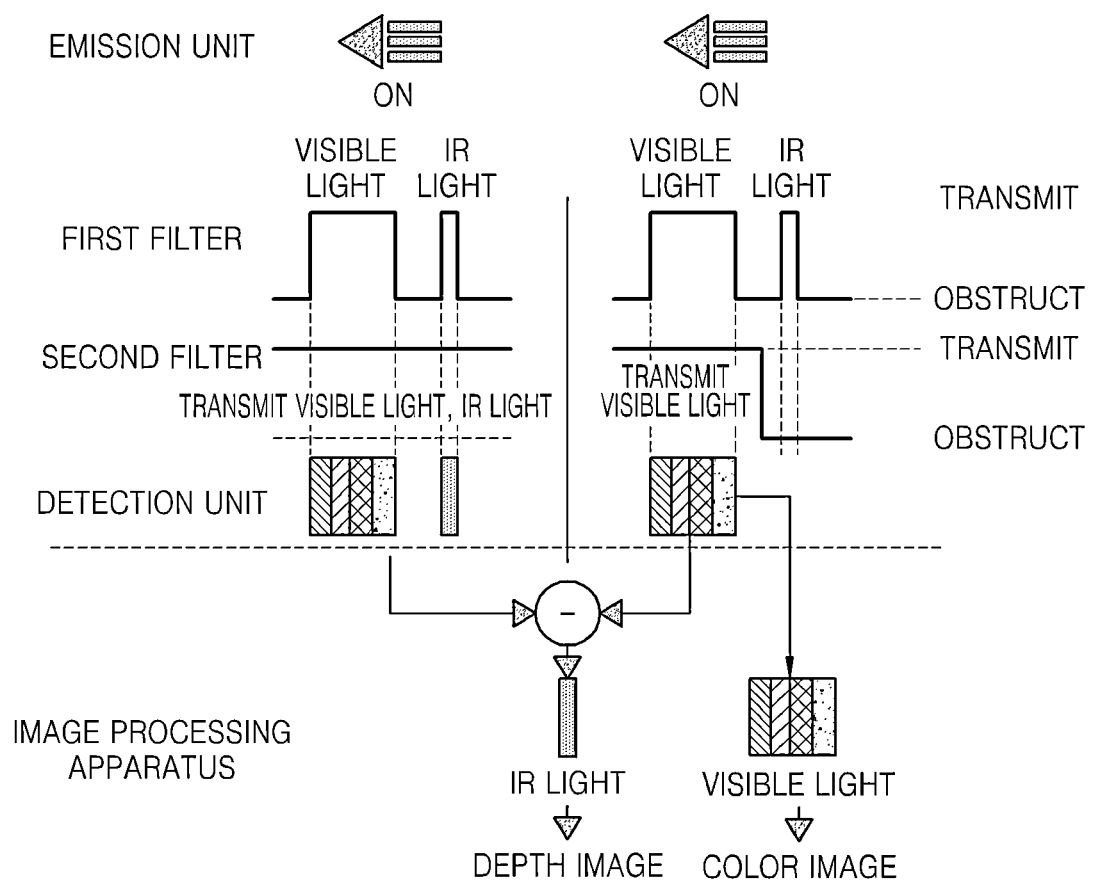
FIG. 8 illustrates a diagram explaining a process of generating a color image and a depth image, according to one or more embodiments.

The color image generation unit 300 may generate a color image by using the captured image that represents visible light. If a difference image obtained by the difference image obtaining unit 310 is an image that represents visible light, e.g., only visible light, a color image may be generated by using the difference image. Alternately, such as illustrated in FIG. 8, if a second image is an image that represents visible light, e.g., only visible light, a color image may be generated by using the second image. Since an image may correspond to color values of a sensor array, which corresponds to respective amounts of charges detected by the detection unit 260, one or more embodiments may have each pixel of the sensor array capture one portion of the color component information, e.g., one of R, G, or B color component information, such that all color component information of each pixel may be determined or calculated by using captured color component information of nearby pixels. Such an image processing method is referred to as a demosaicing method. The color image generation unit 330 may further perform auto white balance (AWG) or gamma adjustment.

The depth image generation unit 340 may generate a depth image by using a depth value that is calculated by the depth value calculation unit 320. For example, the depth image generation unit 340 may employ a lookup table in which a relation between a distance value and contrast is defined, so that contrast for each pixel may be identified, and a depth image may be generated based on the contrast.

Conventionally, in order to generate a color image and a depth image by using a same sensor, visible light transmission filter and a separate IR light transmission filter would be used to respectively pass only visible light to the sensor at one time and pass only IR light to the sensor at another time. For this, a mechanical filtering method may be used, where a mechanical filter device is controlled to pass only the visible light filtered by the visible light transmission filter and pass only the IR light filtered by the IR light transmission filter. However, since this mechanical filtering method needs additional time for driving the respective filters, the speed that a color image and a depth image can be generated may be large. Alternatively, if separate variable filters were used, a first filter could selectively pass one of only visible light and all light, and the second filter could selectively pass one of only IR light or all light, such that the first filter is operated to pass only visible light to generate a color image and separately the second filter is operated to pass only IR light to generate the depth image. However, though, the speed that a color image and a depth image can be respectively generated, i.e., using the respectively separate variable filters, may be increased compared to the mechanical filtering method, this multiple variable filter method requires several inline variable filters, such that a light transmission rate deteriorates, and thus, image quality deteriorates, compared to a light transmission rate and/or image quality provided by one or more embodiments of the present disclosure.

For example, in one or more embodiments, with regard to the image generation apparatus 100 for generating a color image and a depth image, the speed of generating a color image and a depth image and the light transmission rate are improved over the conventional mechanical filtering method and multiple variable filtering method, by using a first filter 230 that may be a fixed filter and a second filter 250 that may be a variable filter. In one or more embodiments, such a fixed aspect of the first filter 230 may represent that the first filter is not a variable filter.

FIG. 4 illustrates a diagram for explaining a process of generating a color image and a depth image, according to one or more embodiments.

Referring to FIG. 4, it may be understood that the emission unit 220 may emit IR light, which may be modulated to have a predetermined frequency, toward the subject 400, and the image generation apparatus 100 may perform two image detection processes on IR light that is reflected from the subject 400 by each process using the first filter 230 and the second filter 250.

A first image may be detected based on the emission unit 220 of the image generation apparatus 100 emitting the IR light toward the subject 400. The subject 400 may reflect not only the IR light emitted by the emission unit 220, but also natural light such as sunlight or light from another visible light source. Accordingly, light incident on the image generation apparatus 100 may be various types of light reflected from the subject 400 and may include not only visible light and IR light, but also light in alternate wavelength bands.

Thus, the first filter 230 may transmit light in multiple wavelength bands, e.g., including visible light and IR light, from among all wavelength bands of light incident on the image generation apparatus 100. This is as described with reference FIG. 2, for example. As illustrated in FIGS. 3A and 4, a first image may be generated based on the second filter 250 selectively transmitting light in all wavelength bands according to a control signal.

Since the second filter 250 transmits light in all wavelength bands when generating the first image, light incident on the detection unit 260 may be identical to the light in multiple wavelength bands that previously passed through the first filter 230. The detection unit 260 may, thus, detect the first image by photo-electrically converting light in the multiple wavelength bands. Here, the light in the multiple wavelength bands includes IR light that is obtained when IR light is emitted toward and reflected from the subject 400, and visible light that is reflected from the subject 400.

A second image may be generated based on the emission unit 220 of the image generation unit 100 emitting IR light, e.g., modulated to have the predetermined frequency, toward the subject 400. Like the detecting of the first image, light incident on the image generation apparatus 100 may be various types of light reflected from the subject 400 and may include not only visible light and IR light, but also light in alternate wavelength bands.

The first filter 230 may, thus, transmit light only in the multiple wavelength bands, from among light incident on the image generation apparatus 100. The second filter 250 may be now controlled to transmit light in a particular/select wavelength band, of the multiple wavelength bands, according to another control signal, such as illustrated in FIGS. 3B and 4.

Since the second filter 250 transmits light in a particular/select wavelength band, light incident on the detection unit 260 may only be light in the particular/select wavelength band of the multiple wavelength bands that have passed through the first filter 230. The detection unit 260 may detect a second image that is obtained by photo-electrically converting light in the particular/select wavelength band. According to one or more embodiments, the particular/select wavelength band may represent IR light, e.g., only a wavelength band corresponding to the IR light emitted toward and reflected from the subject 400.

The image processing apparatus 300 may receive the first image and the second image, as detected by the detection unit 260, and generate a color image and a depth image by using a difference image and the second image, wherein the difference image is obtained by removing/subtracting the second image from the first image. In detail, according to one or more embodiments, the difference image may correspond to visible light, e.g., only visible light, so that a color image may be generated by using only the difference image, for example, and the second image may correspond to IR light, e.g., only IR light, so that a depth image may be generated by using only the second image.

Figure 5A:
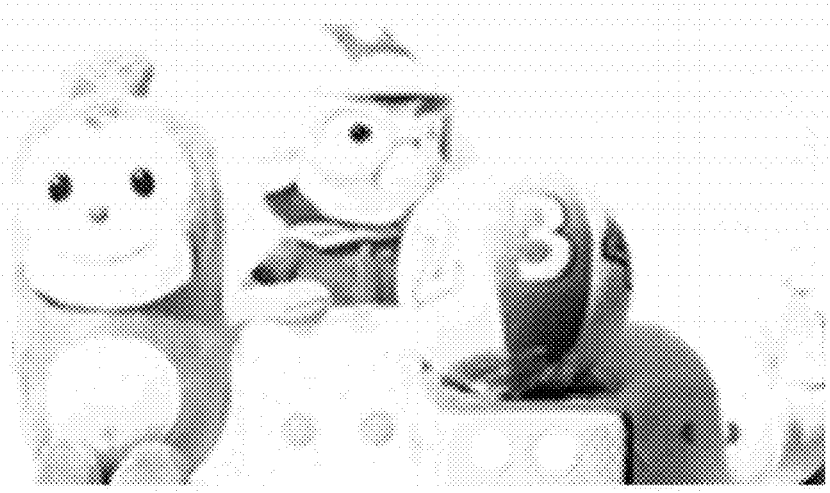
FIGS. 5A and 5B respectively illustrate an image which is generated by using a first image and an image which is generated by using a second image, according to one or more embodiments.
Figure 5B:
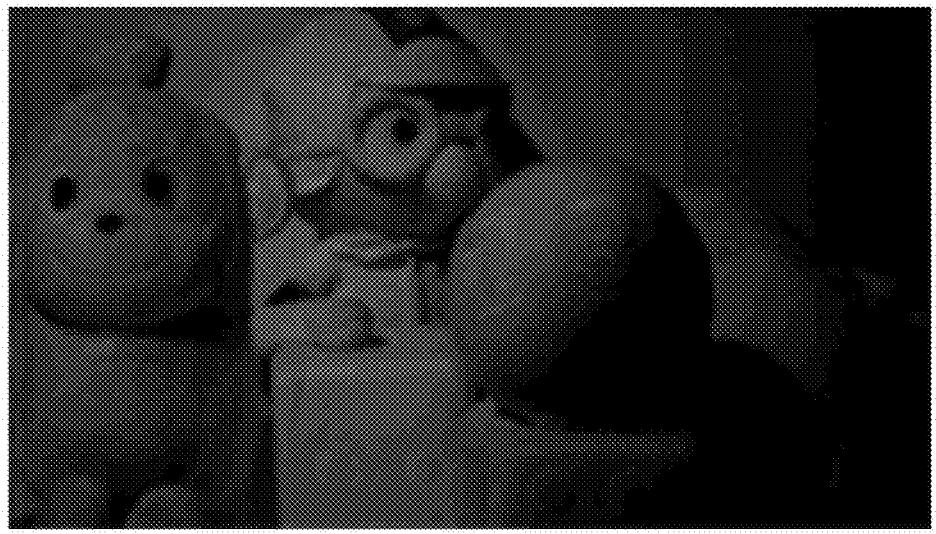

FIGS. 5A and 5B respectively illustrate an image that is generated by using the first image and an image that is generated by using the second image, such as discussed with regard to FIG. 4. In detail, FIG. 5A illustrates an image that is generated by this first image being detected by photo-electrically converting light in multiple wavelength bands, including visible light and IR light. FIG. 5B illustrates an image that is generated based on the second image being detected by photo-electrically converting light in a particular/select wavelength band of the multiple wavelength bands passed by the first filter 230, for example.

Referring to FIG. 5A, since IR light as well as visible light is included in the first image, the whole image may appear bright. On the contrary, since only IR light is included in the second image of FIG. 5B, the whole second image appears dark.

Figure 6:
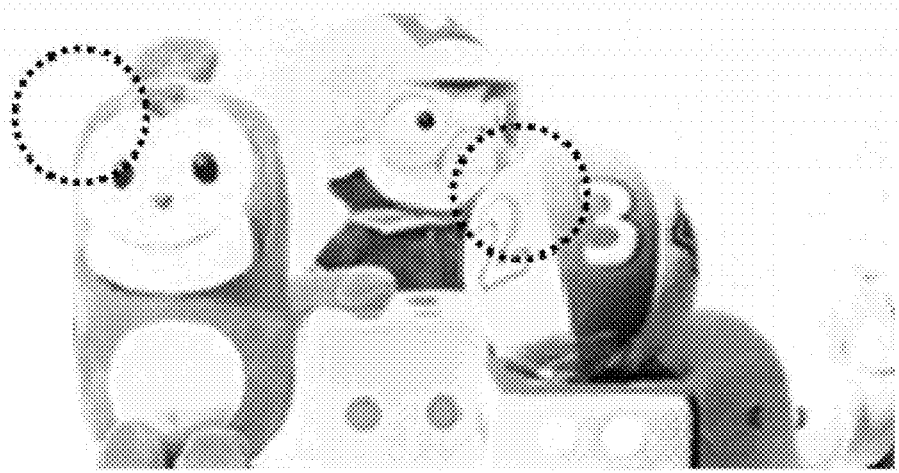
FIG. 6 illustrates an image that may be generated by using a difference image, obtained by removing/subtracting a second signal from a first signal, according to one or more embodiments.

FIG. 6 illustrates an image that may be generated by using a difference image, obtained by subtracting the second signal from the first signal, such as illustrated in FIG. 4, according to one or more embodiments.

Here, the first image is obtained by photo-electrically converting light in multiple wavelength bands, including visible light and IR light, and the second image is obtained by photo-electrically converting light in a particular/select wavelength band which includes IR light, e.g., the predetermined frequency of the emitted IR light. Accordingly, a difference image may be obtained by subtracting this second image from the first image. The difference image may, thus, be identical to a result that could have been obtained by photo-electrically converting light in the visible wavelength band that corresponds to only visible light. It may be understood that the quality of the image shown in FIG. 6 is improved, compared to quality of the image shown in FIG. 5A.

Figure 7:
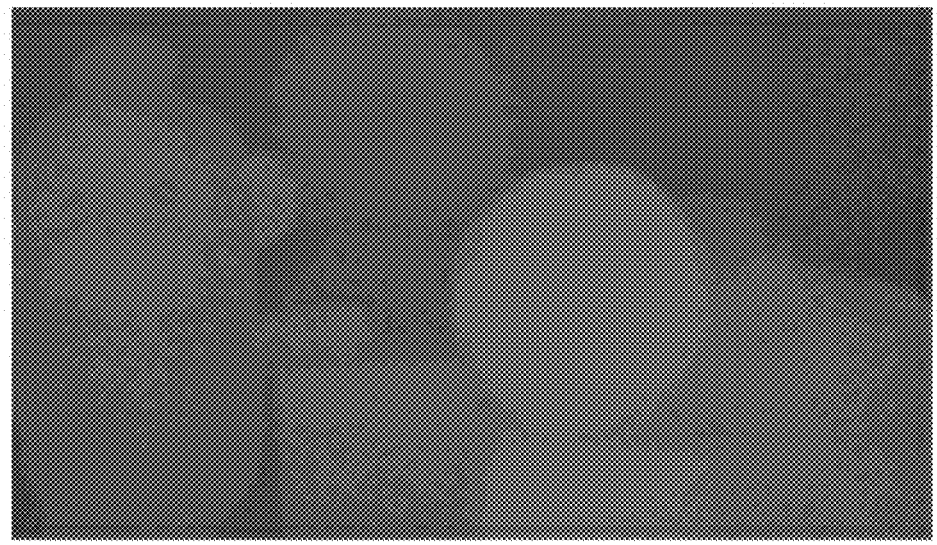
FIG. 7 illustrates a depth image that may be generated by using a second image, according to one or more embodiments.

FIG. 7 illustrates a depth image that may be generated by using a second image, such as illustrated in FIG. 4, according to one or more embodiments.

Referring to FIG. 7, it may be determined that contrasts in the subject 400 in a depth image appear different from each other, according to a perspective of the subject 400. In detail, when the subject 400 is near the image generation apparatus 100 the subject 400 may, thus, appear relatively bright in the depth image, while when the subject 400 is far from the image generation apparatus 100 the subject 400 may appear relatively dark in the depth image, as only an example.

FIG. 8 illustrates a diagram explaining a process of generating a color image and a depth image, according to one or more embodiments.

Referring to FIG. 8, as an example, it may be understood that the emission unit 220 emits IR light, which may be modulated to have a predetermined frequency, to the subject 400. The image generation apparatus 100 may, thus, performs two image detection processes on light that is reflected from the subject 400 by each process using a first filter 230 and a second filter 250.

When generating the first image, because the subject 400 reflects not only the IR light emitted by the emission unit 220, but also natural light such as sunlight, light incident on the image generation apparatus 100 may represent various types of light reflected from the subject 400 and may include not only visible light and IR light, but also light in alternate wavelength bands.

The first filter 230 may transmit/pass incident light in multiple wavelength bands, including visible light and IR light, from among the various types of light incident on the image generation apparatus 100. The second filter 250 may variably transmits light in all wavelength bands according to a first control signal and transmit light in visible light wavelength bands, e.g., only visible light, according to a second control signal.

Since the second filter 250 may transmit light in all wavelength bands, light incident on the detection unit 260 may be the same light in the multiple wavelength bands that was passed by the first filter 230. Thus, the detection unit 260 may detects a first image that is obtained by photo-electrically converting the light in the multiple wavelength bands passed by the first filter 230. The light in the multiple wavelength bands includes IR light that is obtained when IR light is emitted toward and reflected from the subject 400, and visible light that is reflected from the subject 400. The light in the multiple wavelength bands also may include IR light that is incident on the image generation from other sources or IR light from such other sources also reflecting off the subject.

In order to detect a second image, the emission unit 220 of the image generation unit 100 emits the IR light toward the subject 400. Like the detecting of the first image, light incident on the image generation apparatus 100 may be various types of light reflected from the subject 400 and may include not only visible light and IR light, but also light in alternate wavelength bands.

The first filter 230 may transmit light in the multiple wavelength bands, from among light incident on the image generation apparatus 100, and the second filter 250 may transmits light in a particular/select wavelength band, from the multiple wavelength bands, according to a control signal. It is noted that characteristics of this transmission by the second filter 250 shown in FIG. 8 are different from those of the second filter shown in FIG. 4. For example, as illustrated in FIG. 8, the second filter 250 may selectively transmit light in one of all wavelength bands and wavelength bands corresponding to visible light, according to a control signal. Differently, as discussed above, the second filter 250 of FIG. 4 may selectively transmit light in one of all wavelength bands and a wavelength band corresponding to IR light, according to a control signal.

With regard to FIG. 8, since the second filter 250 selectively transmits light in the wavelength band corresponding to visible light, from the multiple wavelength bands passed by the first filter 230, light incident on the detection unit 260 is light of the wavelength band corresponding to visible light. As shown in FIG. 8, the detection unit 260 may detect a second image that is obtained by photo-electrically converting light in the wavelength band corresponding to the visible light.

With further regard to FIG. 8, the image processing apparatus 300 may receive the first image and the second image, which are detected by the detection unit 260, and generate a depth image and a color image by respectively using a difference image and the second image, wherein the difference image is obtained by subtracting the second image from the first image. In detail, the difference image may corresponds to IR light and so that a depth image may be generated from the difference image, and the second image may correspond to visible light and so that a color image may be generated from the second image.

FIG. 9 illustrates a diagram explaining a process of generating a color image and a depth image, according to one or more embodiments.

Referring to FIG. 9, it may be understood that the image generation apparatus 100 may perform an image detection process using light that is reflected from the subject 400 by using the first filter 230 and the second filter 250 three times. To generate a first image in FIG. 9, the emission unit 220 may or may not emit IR light, modulated to have a predetermined frequency, toward the subject 400. As only an example, FIG. 9 will be explained according to an example premise that the emission unit 220 does not emit light in a process of detecting the first image and a second image and emits IR light, modulated to have the predetermined frequency, toward the subject 400 only in a process of detecting a third image.

The first image is detected by using natural light reflected from the subject 400. In other words, light incident on the image generation apparatus 100 may be natural light, such as sunlight and/or light from alternate sources, reflected from the subject 400 and may include visible light and/or IR light that is present in the natural light. The reflected light may further include light from alternate wavelength bands.

The first filter 230 transmits light in multiple wavelength bands, including a wavelength band corresponding to visible light and a wavelength band corresponding to IR light, from among light incident on the image generation apparatus 100. The second filter 250 selectively transmits light in one of all wavelength bands, according to a first control signal, and the wavelength band corresponding to the IR light, according to a second control signal. In the generating of the first image in FIG. 9 the second filter 250 is controlled to transmit light in all wavelength bands according to the first control signal.

Since the second filter 250 transmits light in all wavelength bands, light incident on the detection unit 260 may be the same light in the multiple wavelength bands that was passed through the first filter 230. The detection unit 260 detects the first image by photo-electrically converting light in the multiple wavelength bands. Again, the light in the multiple wavelength bands includes visible light and IR light that are present in the natural light, for example, that is reflected from the subject 400.

Next, a process of detecting the second image is described. Like the detecting of the first image, light reflected from the subject 400 is employed to detect the second image. In other words, light incident on the image generation apparatus 100 may be natural light, i.e., sunlight and/or visible light from light sources other than the emission unit 220, reflected from the subject 400 and may include visible light and IR light that may be present in the natural light as well as light in alternative wavelength bands.

The first filter 230 transmits light in multiple wavelength bands, including visible light and IR light that are present in natural light, from among light incident on the image generation apparatus 100. Here, the second filter 250 may be controlled to transmit light in a particular/select wavelength band of the multiple wavelength bands, according to the second control signal.

Since the second filter 250 transmits light in a particular/select wavelength band from the multiple wavelength bands, light incident on the detection unit 260 is light in that the particular/select wavelength band that was passed by the first filter 230 and the second filter 250. The detection unit 260 detects the second image by photo-electrically converting light in the particular/select wavelength band. As illustrated in FIG. 9, the particular/select wavelength band used to generate the second image may correspond to the IR light that is present in the natural light.

In order to detect a third image, the emission unit 220 of the image generation unit 100 may be controlled to emit IR light, modulated to have a predetermined frequency, toward the subject 400. The subject 400 reflects not only the emitted IR light, but also natural light such as sunlight or light from light sources other than the emission unit 220. Accordingly, light incident on the image generation apparatus 100 may include various types of light reflected from the subject 400 and may include not only visible light and IR light, but also light in alternate wavelength bands.

In the generating of the third image, the first filter 230 transmits light in multiple wavelength bands, including visible light and IR light, from among light incident on the image generation apparatus 100. The second filter 250 may be controlled to transmit light in a particular/select wavelength band ffrom the multiple wavelength bands, e.g., according to the second control signal.

Since the second filter 250 transmits light in the particular/select wavelength band, light incident on the detection unit 260 is the light in the particular/select wavelength band that was passed by the first filter 230 and the second filter 250. The detection unit 260 detects the third image by photo-electrically converting light in the particular/select wavelength band. As illustrated in FIG. 9, the particular/select wavelength band may represent the reflectance of the emitted IR light.

The image processing apparatus 300 may receive the first image, the second image, and the third image, e.g., from the detection unit 260, and generate a color image and a depth image by using a difference image and the third image. The difference image may be obtained by subtracting the second image from the first image. In detail, according to one or more embodiments represented by FIG. 9, since the difference image corresponds to visible light, a color image may be generated from the difference image. Since the third image corresponds to IR light, a depth image may be generated from the third image.

According to one or more embodiments, FIG. 9 may also represent a process of generating a color image and a depth image that have different resolutions. In other words, in order to generate a color image and a depth image, which have different resolutions from each other, two images having a same resolution and one image having a different resolution than that of the two images may be used to generate the color and depth images. Here, generally, since a sensitivity of IR light detected by the detection unit 260 may be weak, a pixel binning method may be used where several pixels of the sensor of the detection unit are used to generate one pixel of the depth image. Thus, if such a pixel binning method is applied to a captured image, a resultant image may have a different resolution from a captured image for which such a binning method is not applied. Thus, the difference image illustrated in FIG. 9 may be obtained by not performing such a pixel binning method on the first and second images, with the pixel binning method being applied only to the third image, for example.

Accordingly, unlike example embodiments described with reference to FIG. 4 and FIG. 8, one or more embodiments with reference to FIG. 9 may include detecting first, second, and third images according to three image detection processes, respectively illustrated left to right in FIG. 9. Then, a difference image may be obtained by using the first and second images having a same resolution, so that a color image may be generated from the difference image, while a depth image may be generated, using such a pixel binning method as only an example, from the third image so that the third image has a different resolution from that of the first and second images.

Figure 10:
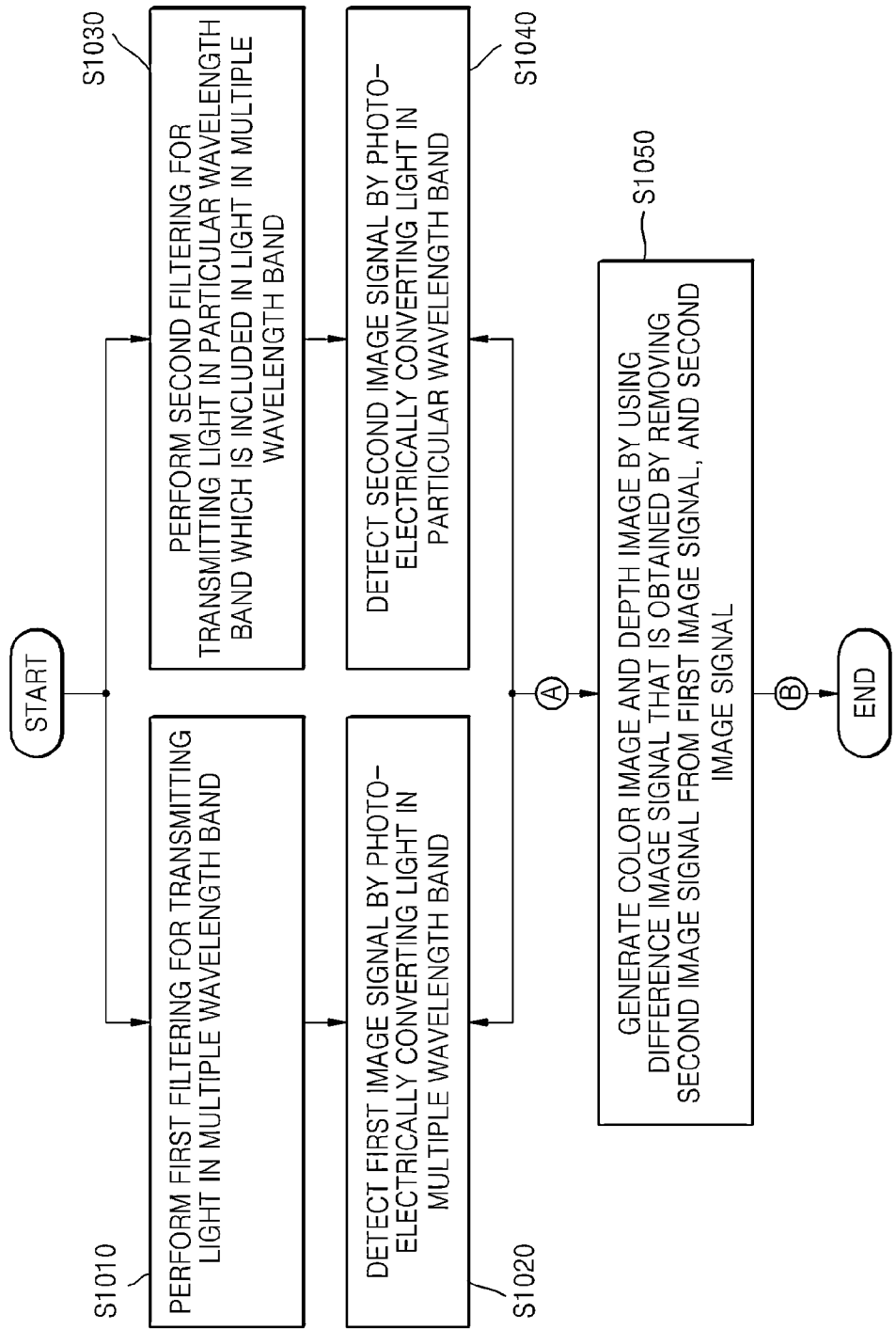
FIG. 10 illustrates a method of generating a color image and a depth image, according to one or more embodiments.

FIG. 10 illustrates a method of generating a color image and a depth image, according to one or more embodiments. Hereinafter, it is noted that depending on embodiment such a method of generating a color image and depth image may be implemented by an image generation apparatus, such as the image generating apparatus 100 of FIG. 1, though embodiments are not limited thereto.

In operation S1010, a first filtering may be performed for transmitting light only with multiple wavelength bands, from light reflected from a subject 400.

The light reflected from the subject 400 may include a reflection of IR light that, modulated to have a predetermined frequency, was emitted toward the subject 400. The light reflected from the subject 400 may also include natural light reflected from the subject 400. The reflected light, on which the first filtering is performed, may include reflected IR light obtained from the emitted IR light and reflected visible light from the natural light reflected from the subject 400.

The first filtering may include only transmitting light in multiple wavelength bands, for example, from all wavelength bands of the light reflected from the subject 400. A second filtering may include transmitting light in a particular/select wavelength band, from the multiple wavelength bands, according to a control signal. As only an example, the first filtering and the second filtering may be performed by a fixed filter and a variable filter. A wavelength band of light that may be transmitted/passed through the variable filter may be changed according to a control signal. For example, if a voltage of a control signal is determined to be equal to or less than a predetermined threshold voltage, the variable filter may pass light in all wavelength bands, while if a voltage of a control signal is determined to be greater than a predetermined threshold voltage, the variable filter may pass only light in a particular/select wavelength band, or block light other than the particular/select wavelength band. In other words, according to the control signal, light in multiple wavelength bands that have passed through the fixed filter, may also pass through the variable filter, or light in a particular/select wavelength band, from the multiple wavelength bands that have passed through the fixed filter, may pass through the variable filter. According to an embodiment, the first filtering may include controlling a control signal to be generated during the first filtering to output a voltage that is equal to or less than a predetermined threshold voltage to the variable filter, so that the light in the multiple wavelength bands that passed the fixed filter directly passes through the variable filter during the first filtering operation. Differently, during the second filtering operation the control signal may be generated to output a voltage that is equal or greater than a predetermined threshold to the variable filter, so that light in only a predetermined wavelength band is passed by the second filtering operation.

In operation S1020, a first image may be detected by photo-electrically converting light in the multiple wavelength bands, such as discussed above.

In operation 1030, the second filtering may be performed to transmit light in the particular/select wavelength band from the light in the multiple wavelength bands.

In operation S1030, the light in the multiple wavelength bands may include IR light obtained when IR light is emitted toward the subject 400 and reflected from the subject 400, and visible light from among natural light reflected from the subject 400. The second filtering may include transmitting light in the particular/select wavelength band, e.g., the IR light included in the multiple wavelength bands. In an alternate embodiment, the second filtering may include transmitting light in a different particular/select wavelength band, e.g., the visible light included in the multiple wavelength bands. Thus, depending on embodiment, only IR light that is reflected from the subject 400 may be transmitted in the second filtering to generate a second image, such as illustrated in FIG. 4 and also in the second and third operations of FIG. 9, or only visible light from among natural light reflected from the subject 400 may be transmitted in the second filtering to generate a second image, such as illustrated in FIG. 8. Operation S1030 may further include a generating of either first or second control signals, as only example, and providing the generated control signal (s) to a variable filter, for example, to pass either all of the multiple wavelength bands or one of passing only IR light and passing only visible light, depending on embodiment.

In operation S1040, a second image may be detected by photo-electrically converting light in a particular/select wavelength band, provided by the second filtering, e.g., only a wavelength band corresponding to IR light is transmitted (or only visible light blocked) as illustrated in FIG. 4, or only a wavelength band corresponding to visible light is transmitted (or only IR light block) as illustrated in FIG. 8.

The illustrated image capturing operation orders in FIGS. 4, and 8 may be performed in any order, depending on embodiment. For example, in FIG. 4, the right image capturing operation of capturing an image from only the IR light may be performed before the left image capturing operation of capturing an image from both IR light and visible light. Thus, at the illustrated point A of FIG. 10 the first and second images may have been determined.

In operation 1050, a color image and a depth image are generated by generating a difference image, with the difference image being obtained by subtracting the second image from the first image. The second image may be used to represent the depth image. At the illustrated point B of FIG. 10, the color and depth images may have been determined. These color and depth image generation operations are described in greater detail with reference to FIG. 11.

Figure 11:
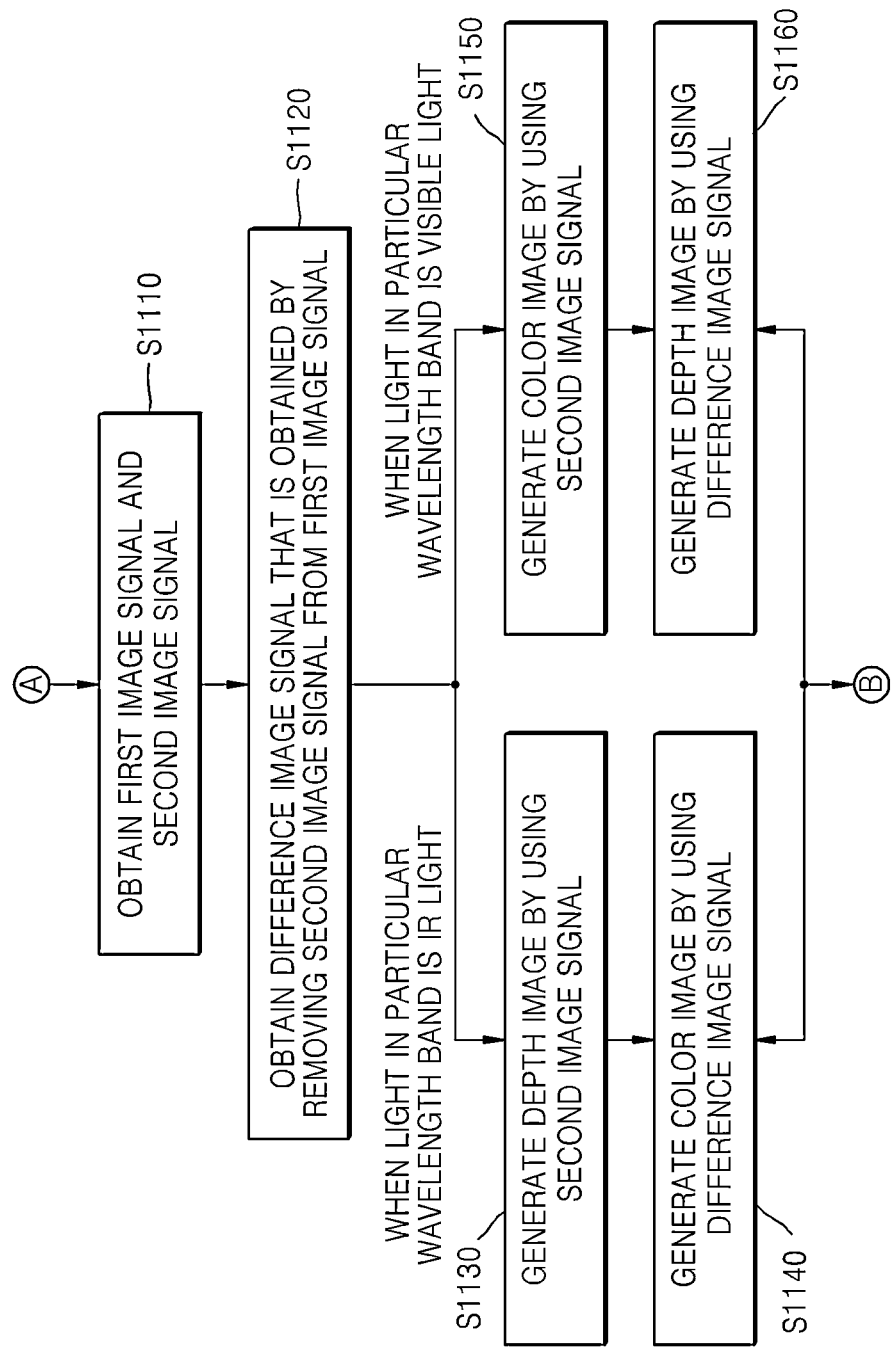
FIG. 11 illustrates a method of generating a color image and a depth image by using a difference image and a second image, according to one or more embodiments.

FIG. 11 illustrates a method of generating of a color image and a depth image by using a difference image and a second image.

In operation S1110, the generated first image and the generated second image may be obtained. In detail, the first image may be generated by photo-electrically converting light in multiple wavelength bands that was passed during a first filtering, e.g., of all incident light of light wavelength bands in addition to visible and IR wavelength bands. The second image may be detected by photo-electrically converting light in a particular/select-wavelength band, from the multiple wavelength bands. As noted above, in one or more embodiments represented by FIG. 4, the particular/select-wavelength band may correspond to IR light, while in one or more embodiments represented by FIG. 8 the particular/select-wavelength band may correspond to visible light. Thus, depending on embodiment, the second image may represent IR light, e.g., only IR light, or the second image may represent visible light, e.g., only visible light. In such example image capturing operations illustrated in FIGS. 4 and 8 the first image and second image may be captured so as to also include reflected IR light that was emitted toward the subject, while FIG. 9 illustrates one or more embodiments where the example first and second images may be generated without including the reflection of an emitted IR light so that only the third image may be generated based on the reflection of the emitted IR light. These examples are non-limiting, and alternate implementations are also available.

In operation S1120, the image generation apparatus 100 obtains a difference image that is obtained by removing/subtracting the second image from the first image.

In operation S1130, if light in a particular/select wavelength band, provided by the second filtering, is IR light (or the blocking of visible light) such as illustrated in FIG. 4, a depth image may be generated by using the captured second image, for example.

In operation S1140, the color image may be generated by using the difference image.

Alternatively, in operation S1150, if light in the particular/select wavelength band, provided by the second filtering, is visible light (or the blocking of IR light) such as illustrated in FIG. 8, a color image may be generated using the corresponding captured second image.

In operation S1160, the depth image may be generated by using a corresponding difference image, obtained by removing/subtracting the corresponding second image from the first image, such as illustrated in FIG. 8. Thus, at the illustrated point B of FIG. 11, the color and depth images may have been determined.

Figure 12:
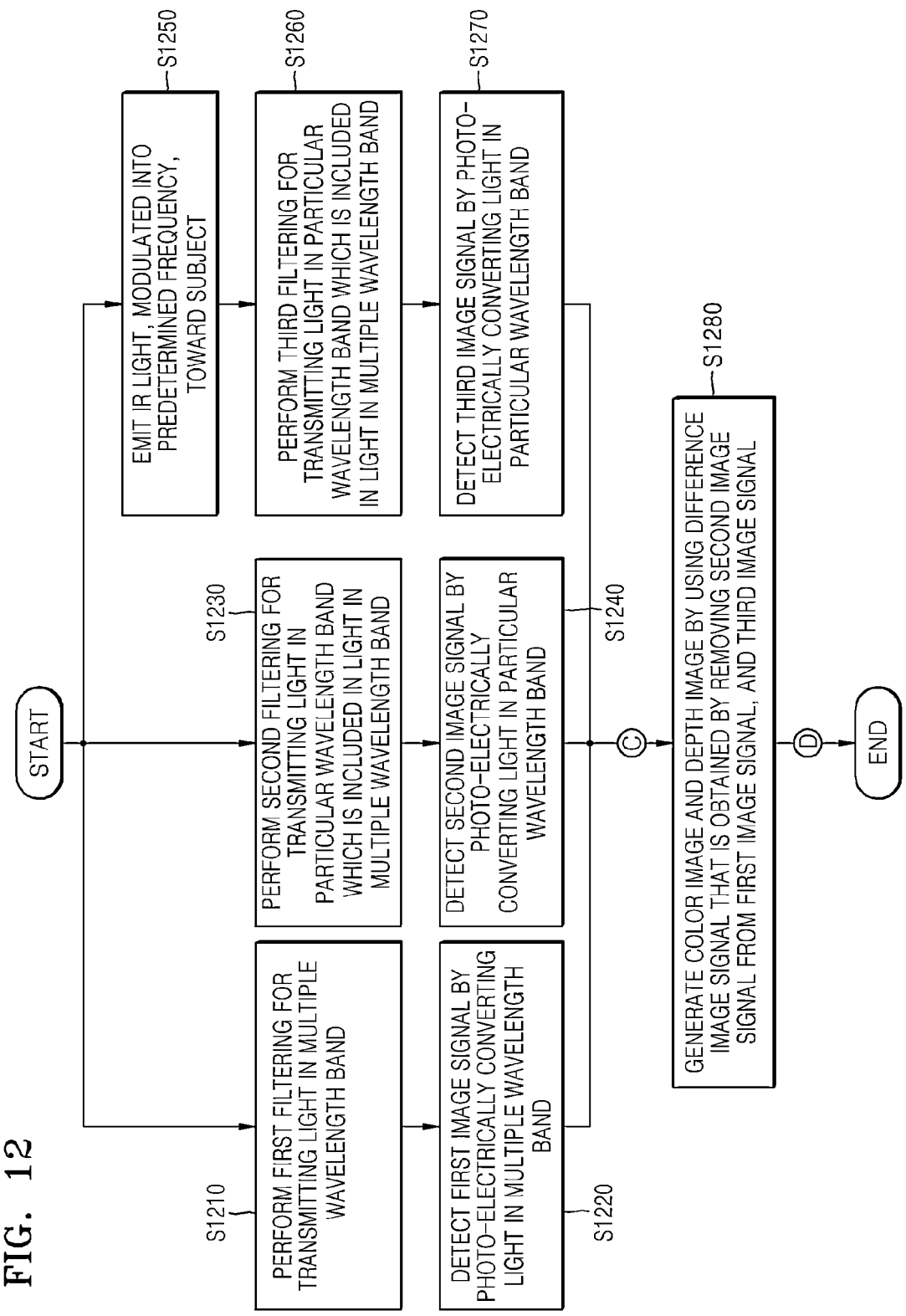
FIG. 12 illustrates a method of generating a color image and a depth image, according to one or more embodiments.

FIG. 12 illustrates a method of generating a color image and a depth image, according to one or more embodiments. Hereinafter, it is noted that depending on embodiment such a method of generating a color image and depth image may be implemented by an image generation apparatus, such as the image generating apparatus 100 of FIG. 1, though embodiments are not limited thereto.

Referring to FIG. 12, three image detection operations, i.e., respectively a first, second, and third filtering, may be performed on respective light that is reflected from the subject 400. Light may not be emitted toward the subject 400 during the first and second filterings, e.g., IR light modulated to have a predetermined frequency may be emitted toward the subject 400 only in a third filtering, such as illustrated in FIG. 9.

In operation S1210, a first filtering may be performed so to transmit light in multiple wavelength bands, filtered from all light included in light reflected from the subject 400.

Since IR light may not be emitted toward the subject 400 in the first filtering operation, light reflected from the subject 400 is natural light such as sunlight and/or other light from other light sources, and may include visible light, IR light, or light in alternative wavelength bands.

The first filtering may be performed to transmit light in multiple wavelength bands, from all incident light reflected from the subject 400, and then a second filtering may be performed to selectively transmit the light in the multiple wavelength bands according to a control signal, for example. The first filtering and second filtering may be implemented by a fixed filter and a variable filter. Wavelength bands of light that may be transmitted through the variable filter can be changed according to the control signal, such as described above with regard to FIG. 9, for example.

In operation S1220, a first image may be detected by photo-electrically converting light in the multiple wavelength bands, passed by the first filtering operation. Differing pixel values, which correspond to respective charges that are photo-electrically converted, may be detected and represented as an image. The light in the multiple wavelength bands that is represented in the first image thus may include visible light and IR light from among natural light reflected from the subject 400. The first image may be detected by photo-electrically converting the visible light and the IR light in an image processing process.

In operation S1230, a second filtering may be performed to transmit light in a particular/select wavelength band included in the multiple wavelength bands.

Here, as IR light modulated to have the predetermined frequency may not be emitted toward the subject 400 in this second filtering operation, such as illustrated in FIG. 9, light reflected from the subject 400 may again be natural light such as sunlight and/or light from other sources, and thus, may include visible light or IR light or light in alternative wavelength bands that are present in the natural light.

The second filtering may be performed by transmitting light in the particular/select wavelength band, included in the multiple wavelength bands, according to a control signal. This particular/select wavelength band may correspond to only IR light (or respectively blocking wavelength bands of all visible light, as only an example).

In operation S1240, a second image may be detected by photo-electrically converting light in the particular/select wavelength band, provided by the second filtering.

In operation 1250, in the third filtering operation, IR light, modulated to have a predetermined frequency, may be emitted toward the subject 400. The subject 400 reflects not only the emitted IR light, but also natural light such as sunlight and/or light from other light sources. Accordingly, incident light on an example image generation apparatus may include various types of light reflected from the subject 400 and may include not only visible light and IR light, but also light alternate wavelength bands.

In operation S1260, the third filtering may be performed to filter the incident light so as to pass light of multiple wavelength bands that include the visible light and the reflected IR light and performed to filter the multiple wavelength bands to transmit light in a particular/select wavelength band, from the multiple wavelength bands that include the visible light and the reflected IR light.

In operation S1270, a third image may be detected by photo-electrically converting light in the particular/select wavelength band, provided by the third filtering operation. Thus, at the illustrated point C of FIG. 12 the first, second, and third images may have been determined, noting that processing of the first and second images to generate a difference image may also be performed while the third image is being generated, depending on embodiment.

In operation 1280 a color image may be generated from the difference image that is obtained by removing/subtracting the second image from the first image, a depth image may be generated from the third image. Thus, at the illustrated point D of FIG. 12 the color and depth images may have been determined.

Figure 13:
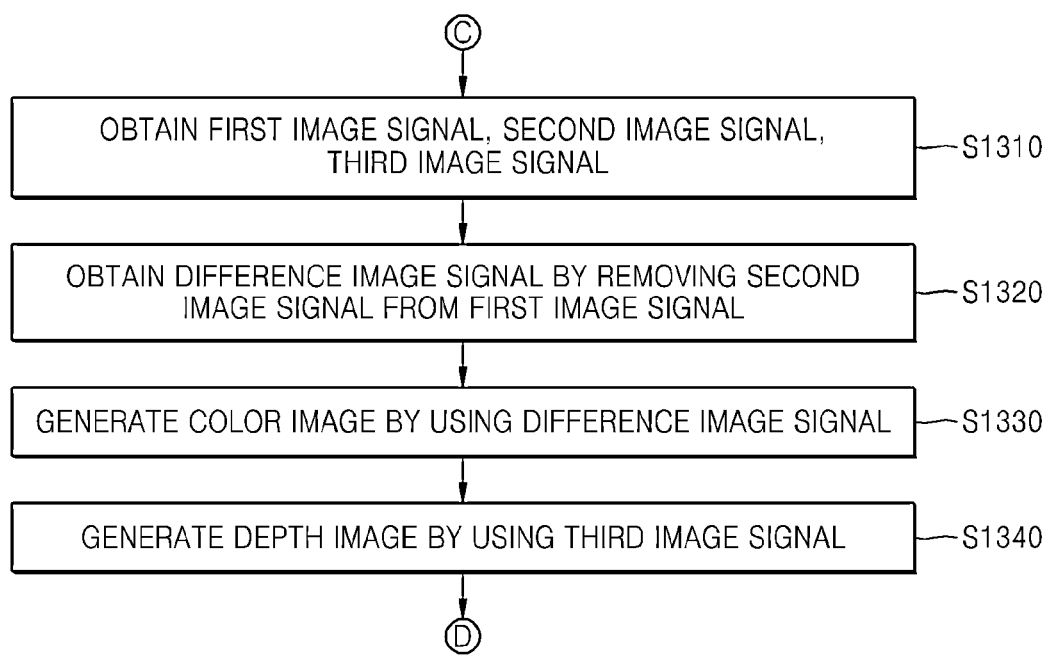
FIG. 13 illustrates a method of generating a color image and a depth image by using a difference image and a third image, according to one or more embodiments.

FIG. 13 illustrates a method of generating a color image and a depth image by using a difference image, from first and second images, and a third image.

In operation S1310, a first image, a second image, and a third signal may be generated. In detail, the first image may be detected by photo-electrically converting light from multiple wavelength bands, e.g., provided by a first filtering. The second image may be detected by photo-electrically converting light in a particular/select wavelength band provided by the second filtering operation. The third image may be detected by photo-electrically converting light in a particular/select wavelength band, for example, from light in multiple wavelength bands that include visible light and a reflection of emitted IR light emitted toward the subject 400. The light in this particular/select wavelength band may include the modulated frequency of the emitted IR light. In an embodiment, the particular/select wavelength band used to generate the second image may be the same particular/select wavelength band used to generate the third image. As noted, the light in the multiple wavelength bands, provided by the first filtering, may be visible light and IR light from among natural light reflected from the subject 400, while the light in the particular/select wavelength band, provided by the second filtering, may only be IR light from among the natural light reflected from the subject 400. The light in the particular/select wavelength band, provided by the third filtering, may only be IR light that is obtained at least from IR light that is emitted toward and reflected from the subject 400.

In operation S1320, a difference image may be obtained by removing/subtracting the second image from the first image. The first image may be detected by photo-electrically converting light in the multiple wavelength bands, passed by the first filtering operation. The second and third images may be respectively detected by photo-electrically converting light in respective particular/select wavelength bands, respectively passed by the second and third filtering operations. Accordingly, the difference image may represent an image obtained by photo-electrically converting the visible light from among natural light reflected from the subject 400.

In operation S1330, a color image is generated by using the difference image.

In operation S1340, a depth image is generated by using the third image.

As described above, according to one or more embodiments, a color image and a depth image may be generated even when only the same image sensor is used for detecting both images, may further provide improved light transmission rates and image generation speeds compared to conventional approaches for detecting color and depth images, and may be generated by employing a first filter that transmits light in multiple wavelength bands and a second filter that selectively transmits light in a particular wavelength band which is included in the light in the multiple wavelength bands.

In addition, one or more embodiments may also be implemented through computer-readable code/instructions in/on a non-transitory medium, e.g., a computer-readable recording medium, to control at least one hardware processing element or device to implement any above-described embodiment. The medium may correspond to any non-transitory medium/media providing the storage and/or transmission of the computer-readable code.

The computer-readable code can be recorded/transferred on a non-transitory medium in a variety of ways, with examples of the medium including recording media, such as magnetic storage media (e.g., ROM, floppy disks, hard disks, etc.) and optical recording media (e.g., CD-ROMs, DVDs, etc.), and transmission media such as Internet hardware transmission media, as only an example. Thus, the non-transitory medium may be such a defined and measurable hardware structure including or carrying a signal or information, such as a device carrying a bitstream according to one or more embodiments of the present disclosure. The non-transitory media may also be a distributed hardware network, so that the computer-readable code may be stored/transferred and executed in a distributed fashion by different hardware devices. Furthermore, the processing element or device may include a processor, a computer processor, a microprocessor, or other processing devices, including processing hardware elements or devices that may be distributed and/or included in a single device.

It should be understood that embodiments described therein should be considered in a descriptive sense only and not for purposes of limitation. Descriptions of features or aspects within each embodiment should typically be considered as available for other similar features or aspects in other embodiments.

While one or more embodiments of the present disclosure have been described with reference to the figures, it will be understood by those of ordinary skill in the art that various changes in form and details may be made therein without departing from the spirit and scope of the present disclosure as defined by the following claims.

What is claimed is:

1. An image generation apparatus generating an image by using light reflected from a subject, the image generation apparatus comprising:
    a first filter configured to transmit light of multiple wavelength bands from the light reflected from the subject;
    a second filter configured to selectively transmit light in a select wavelength band from the light of the multiple wavelength bands, according to a control signal;
    an image sensor configured to detect a first image by photo-electrically converting the light of the multiple wavelength bands and detect a second image by photo-electrically converting the light in the select wavelength band; and
    an image processor configured to generate a color image and a depth image by using a difference image, obtained by subtracting the second image from the first image, and the second image.

2. The image generation apparatus of claim 1, wherein the color image is based on the difference image, and the depth image is differently based on the second image.

3. The image generation apparatus of claim 2, wherein the depth image is not based on the difference image.

4. The image generation apparatus of claim 1, wherein the depth image is based on the difference image, and the color image is differently based on the second image.

5. The image generation apparatus of claim 4, wherein the color image is not based on the difference image.

6. The image generation apparatus of claim 1, further comprising:
    an emission source configured to emit infrared (IR) light, modulated to have a predetermined frequency, toward the subject,
    wherein the light in the multiple wavelength bands includes reflected IR light, obtained when the IR light is emitted toward and reflected from the subject, and visible light reflected from the subject.

7. The image generation apparatus of claim 6, wherein the image processor is configured such that, when the light in the select wavelength band is the reflected IR light, the image processor generates the depth image based on the second image and generates the color image based on the difference image.

8. The image generation apparatus of claim 6, wherein the image processor is configured such that, when the light in the select wavelength band is the visible light, the image processor generates the color image based on the second image and generates the depth image based on the difference image.

9. The image generation apparatus of claim 1, further comprising:
    an emission source configured to emit infrared (IR) light, modulated to have a predetermined frequency, toward the subject,
    wherein the image sensor detects the first image and the second image without emitting the IR light by the emission source and detects a third image, obtained by transmitting light, reflected from the subject, through the first filter and the second filter and photo-electrically converting the transmitted light, with the transmitted light including a reflection of the emitted IR light, and
    the image processor generate a color image and a depth image respectively by using a difference image, obtained by subtracting the second image from the first image, and the third image.

10. The image generation apparatus of claim 9, wherein the image sensor is configured to detects the first image and the second image from transmitted natural light reflected from the subject and transmitted through the first filter and the second filter and respectively photo-electrically converting the natural light.

11. The image generation apparatus of claim 9, wherein the image processor is configured to generates the color image based on the difference image and generates the depth image based on the third image.

12. The image generation apparatus of claim 9, wherein the color image and the depth image have different resolutions.

13. The image generation apparatus of claim 1, wherein the light reflected from the subject sequentially passes through the first filter and then the second filter.

14. The image generation apparatus of claim 1, wherein the second filter transmits light in all wavelength bands when a voltage of the control signal meets a first predetermined threshold, and transmits light in a select wavelength band when the voltage of the control signal meets a second predetermined threshold.

15. The image generation apparatus of claim 14, wherein the first and second predetermined thresholds are a same threshold, so that the second filter transmits light in all of the wavelength bands when the voltage of the control signal differently meets the same threshold than when the control signal meets the same threshold to transmit light in the select wavelength band.

16. The image generation apparatus of claim 1, wherein the image generation apparatus is configured to control what wavelength band of light passes through the first filter and the second filter by controlling the second filter.

17. The image generation apparatus of claim 1, wherein the second filter transmits light in the select wavelength band by preventing light of the multiple wavelength bands, different from the select wavelength band, from passing the second filter.

18. A method of generating an image by using light reflected from a subject, the method comprising:
    performing first filtering to transmit light in multiple wavelength bands that include the light reflected from the subject;
    detecting a first image by photo-electrically converting the light in the multiple wavelength bands passed by the first filtering;
    performing second filtering to transmit light in a select wavelength band from the light in the multiple wavelength bands;
    detecting a second image by photo-electrically converting the light in the select wavelength band passed by the second filtering; and
    generating a color image and a depth image based on a difference image, obtained by subtracting the second image from the first image, and the second image.

19. The method of claim 18, wherein the color image is based on the difference image, and the depth image is differently based on the second image.

20. The method of claim 19, wherein the depth image is not based on the difference image.

21. The method of claim 18, wherein the depth image is based on the difference image, and the color image is differently based on the second image.

22. The method of claim 21, wherein the color image is not based on the difference image.

23. The method of claim 18, further comprising emitting infrared (IR) light, modulated to have a predetermined frequency, toward the subject, wherein the multiple wavelength bands includes reflected IR light, obtained when the IR light is emitted toward and reflected from the subject, and visible light reflected from the subject.

24. The method of claim 23, wherein, when the light in the select wavelength band is the reflected IR light, the generating of the color image and the depth image includes generating the depth image based on the second image and generating the color image based on the difference image.

25. The method of claim 23, wherein, when the light in the select wavelength band is the visible light, the generating of the color image and the depth image includes generating the color image based on the second image and generating the depth image based on the difference image.

26. The method of claim 18, further comprising:

emitting infrared (IR) light, modulated to have a predetermined frequency, toward the subject;

performing third filtering to transmit light in a select wavelength band that includes a reflection of the emitted IR light; and detecting a third image by photo-electrically converting light in the select wavelength band that includes the reflection of the emitted IR light passed by the third filtering, wherein the generating of the color image and the depth image includes generating a difference image, obtained by subtracting the second image from the first image, and the third image.

27. The method of claim 26, wherein the predetermined frequency of the emitted IR light is within the select wavelength band that includes the reflection of the emitted IR light passed by the third filtering.

28. The method of claim 26, wherein the performing of the first filtering comprises transmitting the light in the multiple wavelength bands which includes natural light reflected from the subject, and the performing of the second filtering comprises transmitting the light in the select wavelength band which includes the natural light reflected from the subject without emitted IR light.

29. The method of claim 26, wherein the generating of the color image and the depth image comprises generating the color image based on the difference image and generating the depth image based on the third image.

30. The method of claim 26, wherein the generating of the depth image is not based on the first and second images.

31. The method of claim 26, wherein the color image and the depth image have different resolutions.

32. The method of claim 18, wherein the second filtering transmits light in the select wavelength band by preventing light of the multiple wavelength bands, different from the select wavelength band, from passing in the second filtering.

33. A non-transitory computer-readable recording medium comprising computer readable code to control at least one processing device to implement the method of claim 18.

* * * * *